Aug. 20, 1963     E. C. ELSNER     3,101,213
AUTOMATIC RELEASE HOOK
Filed Feb. 29, 1960     2 Sheets-Sheet 1
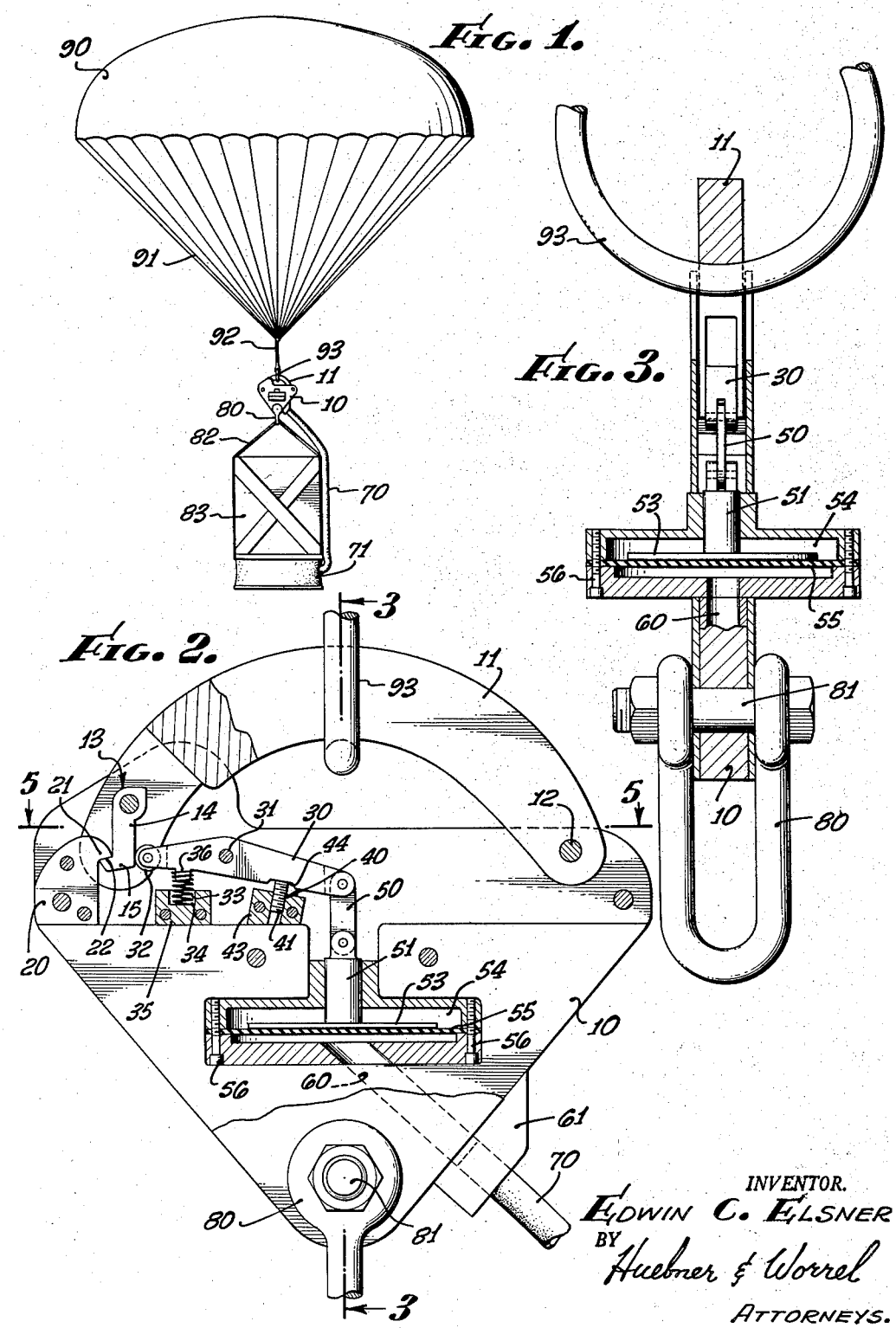
INVENTOR.
EDWIN C. ELSNER
BY
Huebner & Worrel
ATTORNEYS.

Aug. 20, 1963

E. C. ELSNER 3,101,213

AUTOMATIC RELEASE HOOK

Filed Feb. 29, 1960

INVENTOR.
EDWIN C. ELSNER
BY Huebner & Worrel
ATTORNEYS.

3,101,213
AUTOMATIC RELEASE HOOK

Edwin C. Elsner, Pasadena, Calif., assignor to Aeroquip Corporation, Jackson, Mich., a corporation of Michigan
Filed Feb. 29, 1960, Ser. No. 11,845
3 Claims. (Cl. 294—83)

This invention relates to a device from which a load is suspended, and which is designed for automatic releases of the load on contact with a solid surface. One notable use of the device, as illustrated in the drawing, is in cargo drops by parachute, but it will be obvious that the device is equally useful when associated with human parachute jumps, with cargo movement by crane, or with any other operation when a body of substantial weight is to be moved through the air, deposited on a solid surface, and automatically released from its load-carrying apparatus.

In cargo drops from aircraft by parachute, the load is securely attached in suspended position from the parachute. When the load strikes the earth's surface, the parachute is still firmly attached. If there is a substantial ground wind, and unless personnel is immediately available to "dump" the air from the parachute and disconnect it from the load, the load is dragged over the surface, often for substantial distances, with resulting cargo damage, or even total destruction.

Similarly, if it is desired to utilize a crane to lift a cargo and deposit it in a space which is not readily accessible, it is often difficult, and frequently dangerous, to place personnel in position to release the load.

It is an object of the present invention to provide a device which will securely hold a load in suspended position below a support means, but which will quickly and atuomatically release the load from the support means upon contact of the load with a solid surface.

It is another object of the invention to provide a device of the character described which is simple in design, and which has a minimal number of working parts.

A further object of the invention is to provide a device of the character described which is easy and inexpensive to manufacture and assemble.

A still further object of the invention is to provide such a device which is sturdy in construction, easy to set for operational use, and constantly reusable.

With these and other objects in view, the invention consists of the construction, arrangement and combination of the various parts of the device whereby the objects contemplated are attained, as hereinafter set forth, pointed out in the appended claims, and illustrated in the accompanying drawings.

In the drawings:

FIGURE 1 is a front elevational view showing the device in locked operational position mounted on an open parachute.

FIGURE 2 is an enlarged cross-sectional view of the device in said locked position.

FIGURE 3 is a view taken on the line 3—3 of FIGURE 2.

Figure 4:
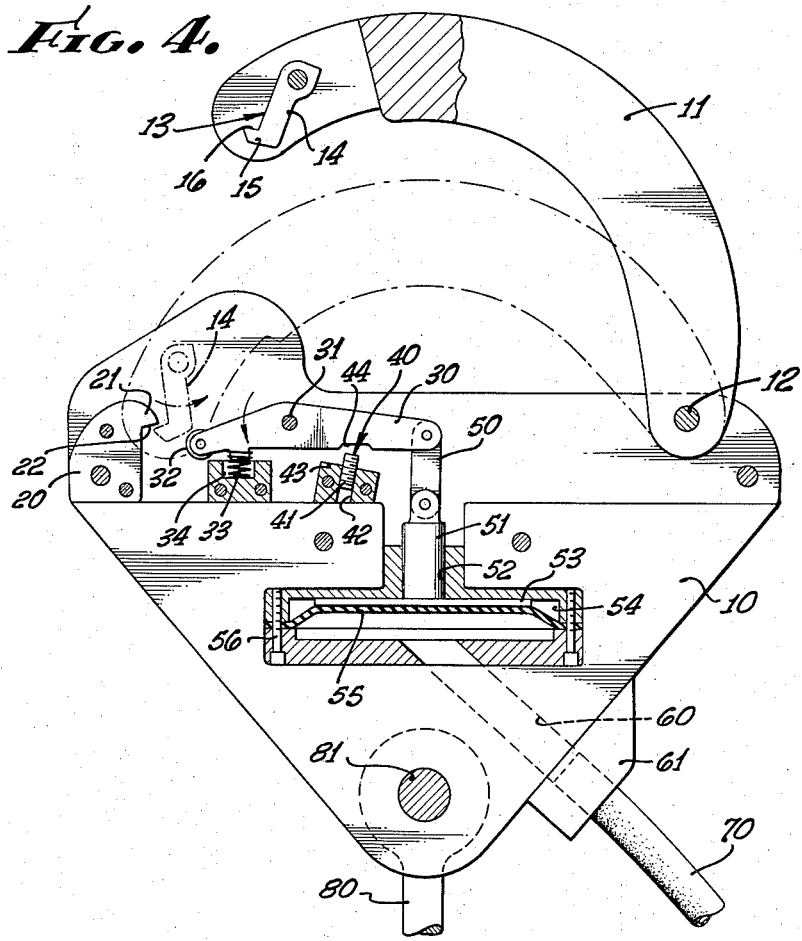
FIGURE 4 is a view similar to FIGURE 2, but with the device in partially open, unlocked position.
Figure 5:
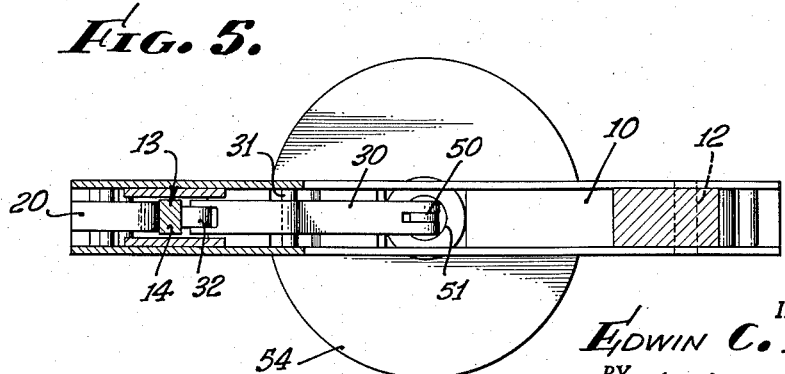
FIGURE 5 is a view taken on the line 5—5 of FIGURE 2.

The device comprises a body structure 10 having an arcuate hook 11 pivotally mounted at one end thereof to said body structure, as by a pin 12.

Pivotally mounted on said hook 11 at the end thereof opposite the pivotal mounting 12 is a latch member 13, having a straight-sided body 14 and an angularly protruding foot 15, which forms an abutting shoulder 16.

Formed or mounted on body structure 10 is a retaining piece or member 20, which has a flanged portion 21 which forms an abutting surface 22 and is disposed so as to abut against shoulder 16 of latch member 13 when the device is in the locked position shown in FIGURE 2, and hold the device in locked position until its release in the manner hereinafter described.

A latching beam 30 is pivotally mounted, intermediate its ends, on body structure 10, as at 31, adjacent to latch member 13 when the device is in said locked position. At the end of beam 30, which is directly adjacent to said latch member 13, is pivotally mounted roller 32, which abuts on said latch member 13 when the device is in said locked position. Said beam 30 is normally biased into said locked position by any suitable means, as by a coil spring 33, which may be seated in a recessed opening 34 in a block 35 mounted on body structure 10, and which at its other end may encircle a protruding stud 36 on beam 30.

An adjustable stop 40 may be provided. In the preferred form illustrated it consists of a threaded bolt or screw 41 adjustably mounted in a bore 42 in a block 43 mounted on body structure 10, said screw being adapted to seat in a recess 44 in beam 30 and to act as an adjustable stop for the biased pivotal movement of beam 30.

Pivotally mounted on beam 30, at the end thereof opposite the end at which roller 32 is disposed, is a link 50. The other end of link 50 is pivotally mounted to a plunger 51, in turn slidably disposed in bore 52 of body structure 10. Plunger 51 has mounted thereon plate 53 which is suspended in chamber 54 in body structure 10. Mounted in suspension in chamber 54 below plate 53 is a diaphragm 55, which may be held in place by any suitable means, as by adjustable screws 56. Plate 53 rests on diaphragm 55.

Air or other fluid passageway 60 is provided at the bottom of chamber 54 and forms a passage between said chamber 54 and a port 61 in body structure 10.

Attached to said port 61, by any suitable means, is a fluid pressure line 70 which leads from a bellows 71 to said port 61.

A clevis 80 is pivotally mounted on said body structure 10, as by pin 81, and said clevis 80 receives a cargo sling 82, which holds a cargo 83 in suspended position, seated on bellows 71 when the device is operational.

The entire device and cargo may be suspended from a parachute 90 by shroud lines 91 and by a suspension line 92 attached to a ring 93, which ring 93 is disposed on hook 11 when the device is in locked position.

The operation of the device is as follows:

A cargo 83 is placed on a bellows 71, and fluid pressure line 70 is connected by means of port 61 to passage 60 in body structure 10, while sling 82 on cargo 83 is disposed in clevis 80. Parachute 90 is attached by means of suspension line 92 and ring 93 to hook 11. Hook 11 is held in closed locked position on body structure 10 by means of latch member 13 and retaining piece 20, and said locked position is maintained by beam 30 and its abutting roller 32. Beam 30 and abutting roller 32 are held in abutment on latch member 13 by the biasing action of spring 33, and said beam 30 is seated on adjustable stop 40, which aids in holding said beam 30 in locked position.

When the load, device and parachute are dropped from, say, an aircraft, the load, seated on bellows 71, is suspended from the body structure 10 of the device, which, in turn, is suspended from parachute 90 by means of the locked hook 11, ring 93, suspension line 92, and shroud lines 91.

While the cargo and device are so suspended, plunger 51 is depressed and plate 53 attached thereto rests on diaphragm 55, both being in suspended position in chamber 54.

Upon contact with the ground or other solid surface, bellows 71 is compressed, forcing fluid pressure through line 70 and passageway 60 into the lower portion of chamber 54, below diaphragm 55.

Such fluid pressure causes diaphragm 55 to expand and distort from the position shown in FIGURE 2 to the position shown in FIGURE 4, thus causing plate 53 to rise in chamber 54, and causing plunger 51 to rise in bore 52. Link 50 then raises the end of beam 30 to which it is pivotally attached, and beam 30 pivots on its pivotal attachment 31, depressing spring 33, and causes roller 32 to move downwardly on body 14 of latch member 13 until it is clear of foot 15. Latch member 13 is thereby free to move pivotally out of abutting contact with retaining piece 20. Hook 11 thereupon pivots on its pivotal mounting 12, freeing the opposite end of hook 11 and from all contact with body structure 10. Ring 93 is then free to slip off hook 11, thus freeing parachute 90 from the device and the cargo load attached to said device.

The device may be easily reset manually by swinging arcuate hook on its pivotal mounting to the closed position shown in detail in FIGURE 2, whereupon latch member 13, impelled by spring-biased beam 30, will be held in locked abutting position against retaining piece 20 until beam 30 is again activated by fluid pressure exerted on plunger 51 in the manner hereinabove described.

Although I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent structures and devices.

I claim:

1. An automatic release structure adapted to interconnect cargo and cargo suspension means wherein lowering of said cargo onto a supporting structure effects separation of said cargo and cargo suspension means; comprising in combination a hook mechanism including a body portion, an arm pivotally secured to said body portion and adapted to be connected to said cargo suspension means, latching means interconnected between said arm and body portion, means forming a chamber carried by said body portion, a member carried within said chamber and movable in response to pressure therein, linkage means connecting said movable member and said latching means whereby pressurizing of said chamber energizes said latching means to release said arm from said body portion and allow pivoting thereof away from said body portion, to thereby release said cargo suspension means connected to said hook mechanism and adapted to carry said cargo, a container of pressure medium adapted to be disposed on the opposite side of said cargo from said hook mechanism, wherein said container is disposed between said cargo and said supporting structure when said cargo is landed, and a pressure medium conduit connected between said container and said chamber and in pressure actuating communication with said movable member, said container being responsive to the weight of the cargo on landing of the cargo to effect pressurization of said chamber through said conduit and pressure actuation of said movable member.

2. The subject matter of claim 1 wherein said container includes a bellows adapted to be collapsed to effect said pressurization.

3. A hook device comprising: a body structure; an arcuate hook pivotally mounted adjacent one end thereof on said body structure; load suspension means releasably mounted on said hook; latching means releasably connecting the other end of said hook and said body structure; a beam pivotally mounted intermediate its ends on said body structure in abutment at one end thereof with said latch means; fluid pressure means at the other end of said beam for moving said beam out of abutment with said latch means; and means mounted on said body structure for suspending a load therefrom, said fluid pressure means comprising a bellows spaced apart in suspension below said body structure so as to receive a load therebetween, a fluid chamber in said body structure, a diaphragm movable in said chamber and partitioning said chamber, a fluid pressure passage from said bellows to said chamber to supply fluid for moving said diaphragm, a plunger slidably mounted in said body structure and engaging said diaphragm, and a linking means which connects said plunger with said beam.

References Cited in the file of this patent
UNITED STATES PATENTS

| | | |
|---|---|---|
| 1,981,461 | Miller | Nov. 20, 1934 |
| 2,371,640 | Manson et al. | Mar. 20, 1945 |
| 2,707,600 | Johnson | May 3, 1955 |
| 2,758,867 | Elsner | Aug. 14, 1956 |